INVENTOR
R. B. NEEDHAM
BY
Young & Quigg
ATTORNEYS

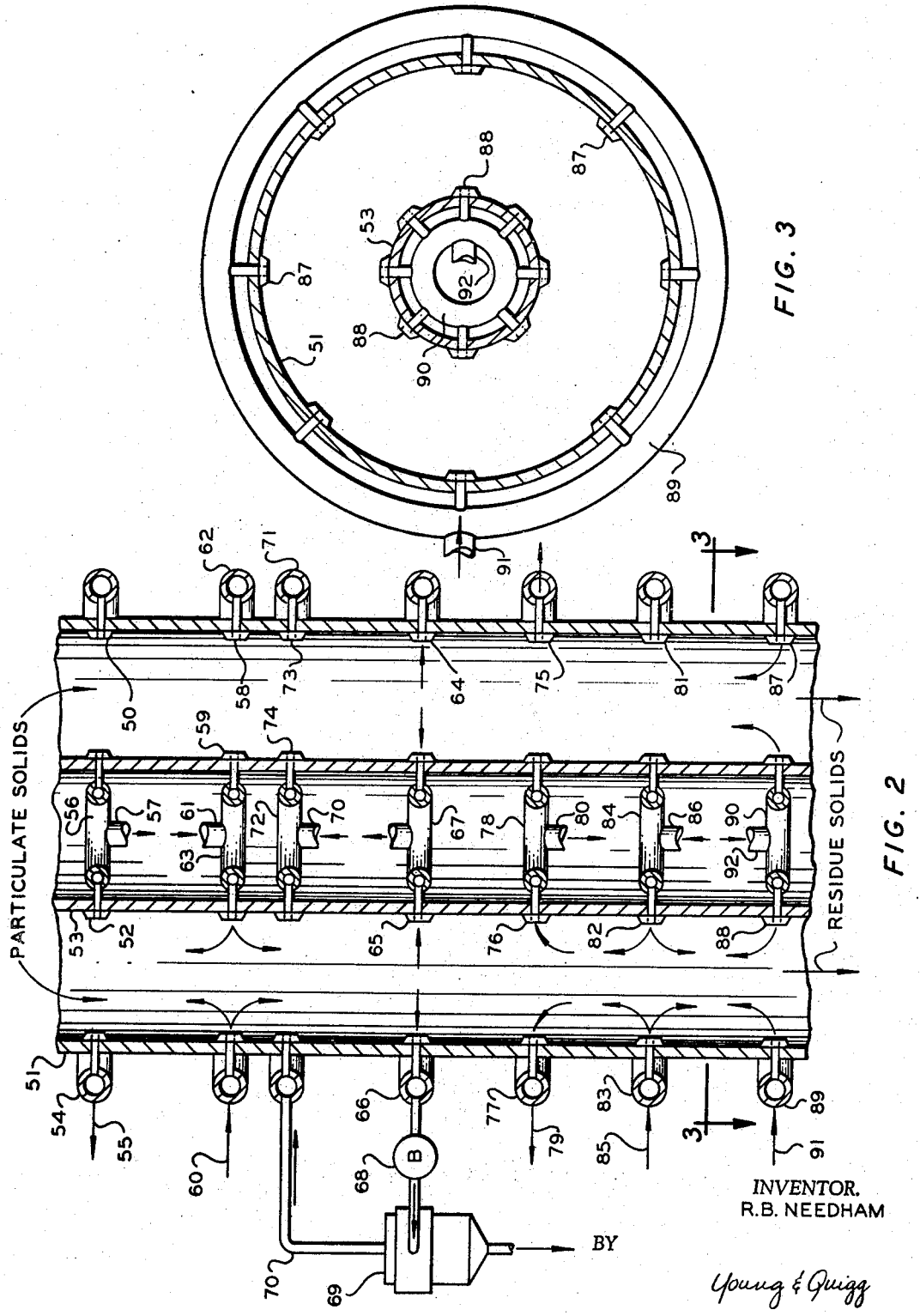

United States Patent Office 3,487,001
Patented Dec. 30, 1969

3,487,001
METHOD AND APPARATUS FOR REMOVING OIL FROM OIL-YIELDING SOLIDS
Riley B. Needham, Bartlesville, Okla., assignor to Phillips Petroleum Company, a corporation of Delaware
Filed Sept. 29, 1966, Ser. No. 583,031
Int. Cl. C10g 1/00; C10b 53/06, 1/04
U.S. Cl. 208—11
7 Claims

ABSTRACT OF THE DISCLOSURE

Hydrocarbons are produced from oil-yielding solids by retorting by passing the solids downwardly through a pyrolysis region, a diffuse region, and a combustion region; supplying some of the heat by burning a fuel in the combustion region; removing noncondensible combustion gases at a first elevation above the combustion region; removing a mixture of gas and fines from the diffuse region at a second elevation above said first elevation; removing fines from the mixture; recycling the gas at a third elevation above said second elevation; introducing a heated condensible gas at a fourth elevation above said third elevation thereby defining the boundary of the diffuse and pyrolysis regions and supplying heat for the pyrolysis region; educing hydrocarbons from the solids in the pyrolysis region; and removing residue from the lower portion of the combustion region.

This invention relates to obtaining hydrocarbons from oil-yielding solids. In one aspect this invention relates to a method of and apparatus for retorting oil-yielding materials to recover useful hydrocarbon products. In another aspect this invention relates to the destructive distillation of hydrocarbonaceous solids such as oil shales, tar sands, coal, and like kerogen-containing materials.

The destructive distillation or retorting method of recovering oil from an oil-yielding solid is relatively simple and straightforward. The essential step of this method is the application of heat in an amount sufficient to educe the oil from oil-yielding solids. The heat necessary to educe the oil from oil-yielding solids can be obtained from a variety of different sources. One conventional method of supplying heat to the oil-yielding solids is to burn a portion of the hydrocarbon contained therein. The heat evolved will serve to educe the oil from the oil-yielding material in the form of a liquid and/or gaseous hydrocarbon product. This hydrocarbon product can then be collected and removed from the retorting zone by any convenient means.

The basic economic requirements of moving large amounts of hydrocarbonaceous solids and efficiently supplying heat to the retorting process can be met by continuously passing oil-yielding solids downward in a retorting vessel as a compact bed in countercurrent contact with hot gases rising from an internal combustion region maintained in the lower portion of the retorting vessel so that product gases and liquids together with the combustion gases flow upward and are removed from the top of the vessel while oil-free solids are removed at the bottom of the retorting vessel. A portion of the liquid product flows by gravity downward in the retorting vessel toward the combustion zone, where such products are revaporized and rise again to the top of the bed where a condensing action occurs upon the cold solids. A refluxing condition is therefore developed with such a recovery system; and such constant refluxing can cause uncontrolled thermal cracking with consequent loss in potential oil yield. Some of the vaporized normally liquid hydrocarbons in contact with the cold solids condense to form a fog or mist which is not precipitated and emerges in a gaseous mixture with noncondensible combustion gases. The noncondensible combustion gases present in the mist recovered from the retort vessel make it difficult to separate and recover hydrocarbon products and necessitate elaborate and expensive recovery systems.

Accordingly, it is an object of this invention to educe and recover hydrocarbons from oil-yielding solids.

Another object of this invention is to minimize refluxing of oil products in retorting oil-yielding solids.

Still another object of this invention is to recover oil products from oil-yielding solids in the form of a mist which is substantially free of noncondensible gases.

Various other objects and advantageous of this invention will become apparent from the following written description, the drawings, and claims.

FIGURE 2 is a vertical cross section of a portion of a retorting vessel similar to that of FIGURE 1.

FIGURE 3 is a horizontal cross section of the retorting vessel of FIGURE 2.

Figure 1:
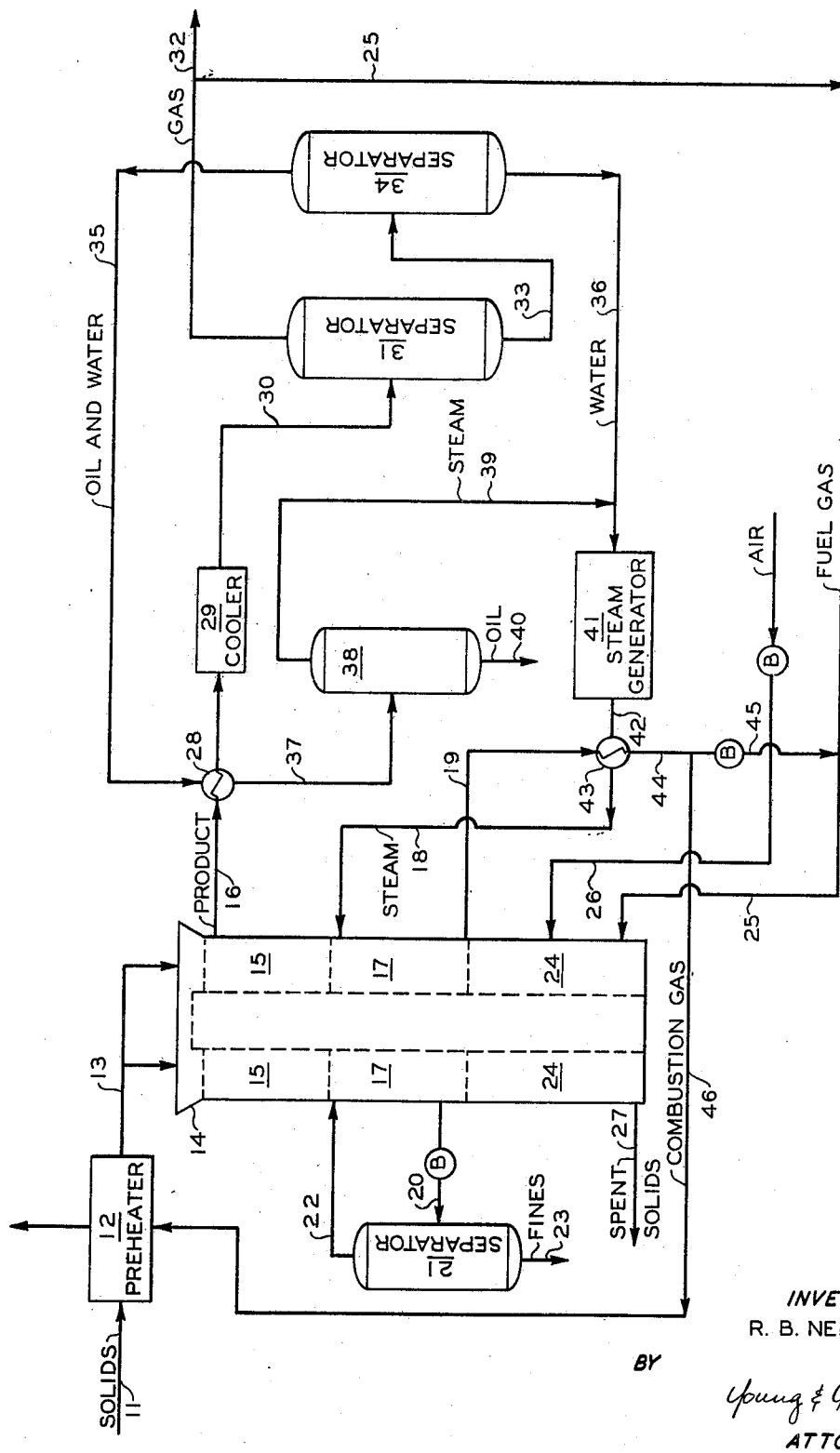
FIGURE 1 is a schematic representation of a retorting vessel and associated equipment.

According to the invention oil-yielding solids in particulate form are introduced into a retorting zone, fuel and oxygen-containing gas are introduced into a combustion region within the retorting zone, a condensible gas is introduced into a diffuse region within the retorting zone, noncondensible combustion gases are removed from the retorting zone, a portion of condensible gas and noncondensible combustion gases mixture is removed from the diffuse region, dust is removed from the gas mixture and the gas mixture is recycled to the diffuse region, hydrocarbons are educed from the solids in a pyrolysis region within the retorting zone, the hydrocarbons are recovered from the retorting zone, and particulate solids are removed from the retorting zone.

Further in accordance with the invention particulate oil-yielding solids in a compact bed progress successively through the pyrolysis region, through the diffuse region, and through the combustion region to a point in the retorting zone where the solids from which oil has been educed are removed. The retorting zone can be of any suitable design, for example, a horizontal furnace. In one advantageous embodiment of the invention the retorting zone comprises a substantially vertical column containing a combustion region in the lower section of the retorting column, a diffuse region above the combustion region and a pyrolysis region above the diffuse region.

The terms "oil shale" and "shale" will be used in the following description of one embodiment of the invention, but it should be understood that the invention is not limited to processing oil shale but is applicable to other kerogen-containing solids. It is well-known that oil shale, an oil-yielding solid, does not contain oil per se but contains an organic substance, kerogen, which when heated at sufficiently high temperatures, converts to oil. When oil shale is retorted, the kerogen converts to an oil which is vaporized so as to be displaced from the residual mineral solids in a stream of gases and liquids.

Oil shale in particulate form is introduced into the retorting apparatus in a compact bed. It is desirable to remove fines from the crushed shale before feeding it to the retorting apparatus. Excessive amounts of fine particles in the moving bed of solids cause channeling of gas flow and thus reduce the amount of hydrocarbon product educed from the solids. Solid particles can be heated before being introduced into the retorting apparatus to allow close control of pyrolysis region temperatures. The compact bed is continuously fed to the pyrolysis region wherein kerogen is converted and hydrocarbons are educed from the oil shale. Heat to the pyrolysis region is supplied by preheated shale particles, by a superheated condensible gas and by heat transfer from the combustion region. Flow of the solids bed can be controlled at a rate which permits eduction of a substantial portion of the hydrocarbons from the particulate solids. Temperatures of 700 to 1050° F. in the pyrolysis zone can be used to convert the kerogen and educe hydrocarbons. Temperatures of 900 to 1000° F. are suitable for eduction of hydrocarbons from oil shale at an economical rate.

Superheated condensible gas flowing into the pyrolysis region from the diffuse region not only supplies a major portion of the heat required to educe the hydrocarbons but acts to "sweep" oil from the solids and form a stable mist of superheated condensible gas and the hydrocarbons. By suspending hydrocarbon liquids in such a stable mist, there is no precipitation of the liquids and refluxing is avoided. If desired, a nucleation agent, for example, sodium chloride, can be used to promote formation of a stable mist. It is advantageous to operate a pyrolysis region at atmospheric pressure, thus minimizing the motive force on the solids bed. Operation at atmospheric pressure also permits the use of simplified apparatus since pressure seals are not necessary. Hydrocarbons are recovered from the pyrolysis region in the form of a mist comprising condensible gases, hydrocarbon vapors and disperse droplets of hydrocarbon liquids. A conventional condensation system can be used to separate the hydrocarbons from the mist.

The moving shale particle bed progresses to the diffuse region wherein substantially all noncondensible combustion gases are removed and a superheated condensible gas is introduced. The condensible gas inlet pressure can be maintained at a slightly higher value than the combustion gas outlet pressure thus promoting separation of the gases. Substitution of superheated condensible gas for the noncondensible combustion gases allows economies in the separation of the product mist recovered from the pyrolysis region.

Attrition during movement of a compact particle bed creates fine particles which are detrimental to the process. A mixture of these fines, condensible gas and a small amount of noncondensible gas is removed from the diffuse region; fines are removed from the mixture, and the mixture is recycled to the upper portion of the diffuse region. Removing the fines and recycling the gas mixture reduces the amount of gas channeling in the pyrolysis zone. Recycling also creates a pressure in the upper portion of the diffuse region which aids in controlling the size of the diffuse region and promotes the separation of condensible gases from noncondensible gases within the region. Suitable condensible gases are steam or a vaporized light hydrocarbon, for example kerosene. When steam is used, ammonia is generated and is recovered from the product mist. Ammonia can be separated from the product by conventional methods.

From the diffuse region the compact bed of particulate shale moves through the combustion region wherein fuel and oxygen-containing gas are introduced. Any suitable fuel can be used. An economical method of supplying fuel to the combustion region is to recycle a portion of the hydrocarbons removed from the product mist. Air is a suitable oxygen containing gas. The temperature of the shale particles is sufficient to ignite the fuel-oxygen gas mixture. Heat generated from burning the fuel and residue hydrocarbons in the shale is conducted countercurrent to the movement of the shale bed and supplies a portion of the heat energy needed to educe hydrocarbon products from the pyrolysis zone. Temperatures in the combustion region can be controlled so as to achieve a desired temperature in the pyrolysis zone. After passing through the combustion region the substantially oil-free solids are removed from the retorting zone.

Practice of the invention in a vertical annular retort is especially advantageous because it allows close control of conditions determinative of the regions within the retorting zone and utilizes gravity flow of the particulate solids. A plurality of ports positioned in an inner wall and across from a plurality of ports positioned in the outer shell can be used to efficiently introduce and remove substances from a downwardly flowing compact bed of particulate shale.

Referring now to the FIGURE 1, particulate oil-yielding solids are moved through line 11 and are heated to a desired temperature, for example, 300° F. in preheater 12. From preheater 12, a compact bed of solids is introduced through line 13 into the retorting column 14. The compact bed of particulate solids flows into pyrolysis region 15 and educed hydrocarbon products are removed via line 16. A condensible gas, for example, superheated steam, is introduced into the upper portion of diffuse region 17 through line 18. Noncondensible combustion gases are removed from the lower portion of diffuse region 17 via line 19. A mixture of steam, fines and small amounts of combustion gases is removed from diffuse region 17 via line 20 to separator 21. After removal of a substantial portion of the fines, the gases are recycled to diffuse region 17 via line 22. Fines are removed from separator 21 through line 23.

In combustion region 24, fuel is introduced via line 25 and oxygen-containing gas, for example air, is introduced via line 26. Upon flowing downward through pyrolysis region 15, diffuse region 17, and combustion region 24, residue solids are removed from retorting column 14 through line 27.

A suitable product mist separation system is illustrated in conjunction with the retorting system in FIGURE 1. Product mist, removed from pyrolysis region 15 via line 16, flows through heat exchanger 28 to cooling zone 29 wherein steam and a portion of the hydrocarbon vapors are condensed. Water-hydrocarbon product mixture flows through line 30 to separator 31. Hydrocarbon vapors are removed from separator 31 overhead through line 32. If desired, a portion of the hydrocarbon vapors can be transferred via line 25 to combustion region 24 to be used as fuel. Liquid hydrocarbons and water are removed from separator 31 via line 33 to separator 34 wherein a portion of the water is separated from the mixture. Liquid hydrocarbon-water mixture is removed from separator 34 via line 35 and water is removed via line 36. The mixture passes through heat exchanger 28 wherein the water is vaporized. Steam-liquid hydrocarbon mixture is transferred from heat exchanger 28 via line 37 to separator 38. In separator 38 the steam is removed overhead via line 39 and liquid hydrocarbon products are removed via line 40.

Steam flowing through line 39 and water flowing through line 36 are admixed and flow to steam generator 41. Steam is removed from steam generator 41 through line 42 and flows through heat exchanger 43 wherein additional heat is transferred from the combustion gases to the steam. From heat exchanger 43 steam is transferred through line 18 to diffuse region 17.

Combustion gases are removed from diffuse region 17 and flow through line 19 to heat exchanger 43 to warm condensible gases. Combustion gases are removed from heat exchanger 43 through line 44. If desired, a portion of the combustion gases can be recycled through line 45 and admixed in line 25 with the fuel gas flowing to combustion region 24. One advantageous use of excess combustion gas is to cycle the gases through line 46 to preheater 12, thereby supplying portion of the heat required to preheat the particulate solids.

In the annular retort of FIGURE 2, a plurality of ports 50 are positioned in the wall of outer retort shell 51 and a plurality of ports 52 are positioned in the wall of inner wall shell 53 directly across from ports 50. Ports 50 communicate with a manifold 54 and product mist is drawn into manifold 54 through ports 50 and removed via conduit 55. Ports 52 communicate with manifold 56 providing for the removal of product mist through conduit 57. Thus, ports 50 and ports 52 define the upper limit of a pyrolysis region within the retorting apparatus.

A plurality of ports 58 in shell wall 51 and a plurality of ports 59 in shell wall 52 are used to introduce a superheated condensible gas into a compact bed of oil-yielding particles. Superheated condensible gas is introduced through conduits 60 and 61 into manifolds 62 and 63 which communicate with the ports. The introduction of steam at this location defines the lower limits of the pyrolysis region and the upper limits of a diffuse region with the retorting vessel.

Removal of fines-gas mixture is effected through a plurality of ports 64 and 65 communicating with manifolds 66 and 67. A blower 68 is used to transfer the mixture to a cyclone separator 69. One separator is shown but if desired a plurality of separators can be used. Conduit 70 communicating with manifolds 71 and 72 recycles the gas through a plurality of ports 73 and 74 to the retorting apparatus.

A plurality of ports 75 in shell wall 51 and a plurality of ports 76 in shell wall 53 are utilized to remove noncondensible combustion gases. Combustion gases are drawn through ports 75 and 76 into manifolds 77 and 78 and are removed through conduits 79 and 80 thus defining the lower limit of the diffuse region and the upper limit of a combustion region within the retorting apparatus.

Oxygen-containing gas is supplied to the retorting apparatus through ports 81 and 82 in combination with manifolds 83 and 84 are conduits 85 and 86. Fuel is supplied to the retorting apparatus through ports 87 and 88 in combination with manifolds 89 and 90 and conduits 91 and 92.

FIGURE 3 is a plan view taken on line 3—3 in FIGURE 2 and illustrates the port and manifold system. Like numerals in FIGURES 2 and 3 denote like elements. A plurality of ports 87 is positioned in outer shell wall 51 and connected into manifold 89. A communicating conduit 91 supplies manifold 89 with fuel to be fed to the retorting apparatus. Fuel is also introduced through a plurality of ports 88 in wall 53 in combination with manifold 90 and conduit 92.

Ports have been illustrated as being slightly raised from the shell walls but it is obvious that the ports can be set flush or recessed in the shell walls. The following example will further illustrate the invention.

EXAMPLE

"Mahogany Ledge" shale from the Green River formation, having an oil content of 28 gal./ton by Fisher assay, is crushed to obtain particles with a major dimension of 3 inches or less. The crushed shale is screened to remove particles having a major dimension of ½ inch or less. The crushed screened shale is preheated to 250° F. Preheated particulate shale is introduced into retorting zone 14 at a rate of 600 tons/hr. Spent solids are removed via line 27 at a rate of 474 tons/hr. 810,000#/hr. of superheated steam at 1000° F. under a presssure of 13 p.s.i.a. is introduced into diffuse region 17 through line 18. 13.4M c.f./hr. of combustion gases are removed via line 19.

Attrition during the downward movement of the compact particulate bed creates fines which, if not removed, cause "gas channeling." 800#/hr. of particles having less than .05 inch major dimension are removed in separator 21 at 10M c.f./hr. of combustion gases are removed via cycled via line 22.

Product mist is removed through line 16. Separation results in 188M c.f./hr. of gas recovered through line 32 and 360 bbl./hr. of oil recovered through line 40.

Thus, it can be seen that large quantities of oil shale can be retorted to obtain a high yield of hydrocarbons in the form of a mist from which the hydrocarbons can be easily separated.

Reasonable modification and variation are within the scope of this invention which sets forth a method and apparatus for recovering oil from oil-yielding solids.

That which is claimed is:

1. A process for recovering hydrocarbons from oil-yielding solids comprising the steps of:
  (a) heating oil-yielding solids in particulate form;
  (b) introducing the heated oil-yielding particulate solids into a retorting zone comprising a pyrolysis region, a diffuse region, and a combustion region arranged vertically;
  (c) passing the oil-yielding particulate solids downwardly successively through said pyrolysis region, said diffuse region, and said combustion region;
  (d) introducing oxygen-containing gas and fuel into the lower portion of said combustion region and maintaining combustion in said combustion region to supply a portion of the heat required to educe hydrocarbons from the oil-yielding solids;
  (e) removing noncondensible combustion gases at a first elevation spaced above the introduction of said oxygen-containing gas and fuel thereby defining the upper limit of said combustion region and the lower limit of said diffuse region;
  (f) removing a fines-gas mixture from said diffuse region and at a second elevation spaced above said first elevation, removing fines from the mixture and recycling the gas mixture to said diffuse region at a third elevation spaced above said second elevation;
  (g) introducing a heated condensible gas at a fourth elevation spaced above said third elevation thereby defining the upper limit of said diffuse region and the lower limit of said pyrolysis region and thereby aplying heat to said pyrolysis region;
  (h) educing hydrocarbons from the oil-yielding solids in said pyrolysis region at a fifth elevation spaced above said fourth elevation thereby defining the upper limit of said pyrolysis region; and
  (i) removing residue particulate solids from a lower portion of said combustion region.

2. The process of claim 1 wherein said condensible gas comprises steam.

3. The process of claim 2 wherein steam and water are recovered from said hydrocarbon-steam mixture, fed to a steam generator and recycled to said diffused region in said retorting zone.

4. The process of claim 1 wherein said condensible gas comprises a vaporized light hydrocarbon fraction.

5. The process of claim 1 wherein said oil-yielding solid comprises oil shale.

6. The process of claim 1 wherein said fuel comprises a portion of the recovered hydrocarbons.

7. The process of claim 1 wherein said oxygen-containing gas comprises air.

References Cited

UNITED STATES PATENTS 2,725,347 11/1955 Leffer _____ 208—11
3,349,022 10/1967 Mitchell et al. _____ 208—11
3,384,569 5/1968 Peet _____ 208—11

DELBERT E. GANTZ, Primary Examiner

T. H. YOUNG, Assistant Examiner

U.S. Cl. X.R.

196—126; 201—27, 29, 34; 202—121